Aug. 11, 1936.  W. C. ROBINSON ET AL  2,050,544
ORIFICE METER FITTING
Filed Sept. 17, 1935  3 Sheets-Sheet 1

Inventors
WILLIAM C. ROBINSON
and PATRICK H. ROBINSON
By
Their Attorney

Aug. 11, 1936.   W. C. ROBINSON ET AL   2,050,544
ORIFICE METER FITTING
Filed Sept. 17, 1935   3 Sheets-Sheet 2

Inventors
WILLIAM C. ROBINSON
and
PATRICK H. ROBINSON
By
Their Attorney

Aug. 11, 1936.   W. C. ROBINSON ET AL   2,050,544
ORIFICE METER FITTING
Filed Sept. 17, 1935   3 Sheets-Sheet 3

Inventors
WILLIAM C. ROBINSON
and
PATRICK H. ROBINSON
By
Their Attorney

Patented Aug. 11, 1936

2,050,544

UNITED STATES PATENT OFFICE 2,050,544

ORIFICE METER FITTING

William C. Robinson and Patrick H. Robinson, Los Angeles, Calif., assignors to Robinson Orifice Fitting Company, Los Angeles, Calif., a corporation of Nevada Application September 17, 1935, Serial No. 40,926

26 Claims. (Cl. 138—44)

This invention has to do with means for metering fluid and relates more particularly to an orifice meter fitting adapted to be interposed in a pipe line or conduit. A general object of this invention is to provide an improved orifice meter fitting in which the orifice plate may be very easily and quickly removed for replacement without interrupting the flow through the pipe line.

Another object of this invention is to provide an orifice meter fitting that is adapted to handle or embody an orifice plate of large size and that is operable to move the plate between its operative position across the fluid passage and a position at the exterior of the fitting housing without manually lifting or handling the plate.

Another object of this invention is to provide an orifice meter fitting in which the orifice plate is inserted and removed through a lateral opening in the housing whereby the fitting requires a minimum of head room and the installation, replacement, etc. of the orifice plate is made particularly convenient.

Another object of this invention is to provide an orifice meter fitting in which the lower section of the housing may constitute a permanent or fixed part of the pipe line and carries a plug valve whereby the upper section of the housing and the mechanism connected therewith may be removed for repair, etc. when the plug valve is closed without interrupting the flow through the pipe line.

Another object of the invention is to provide an orifice meter fitting that embodies a cover plate for normally closing the opening through which the orifice plate is inserted and removed and a novel means for tightly holding the cover plate in position that is such that the cover plate may be quickly removed and replaced with a minimum number of simple manual operations.

Another object of the invention is to provide an orifice meter fitting in which the orifice plate carrier is pivotally connected with the elevator screw whereby the carrier may centralize itself upon being lowered to the operative position and whereby the carrier is automatically swung or pivoted through an opening in the housing for convenient removal and replacement upon being elevated to the removal position.

Another object of this invention is to provide an improved means for removably retaining an orifice plate in its carrier that automatically provides seals at both sides of the orifice plate and at both housing seats when the carrier is operated to the lower position so that there are no spaces or crevices in which dirt or solid matter may accumulate.

Another object of the invention is to provide an orifice meter fitting that does not embody or necessitate screws, gears or other means for clamping or holding the orifice plate or its carrier in active position or in sealing engagement with the body seats.

Another object of this invention is to provide an orifice meter fitting embodying a lubricated plug valve for sealing off between the upper and lower body chambers in which the pressures at its opposite ends are balanced whereby it is very easy to operate or turn.

Another object of this invention is to provide an orifice meter fitting of the character mentioned embodying novel and very effective means for quickly lubricating the plug valve that evenly distributes the lubricant under pressure to the sealing surfaces of the valve.

Another object of this invention is to provide an orifice meter fitting of the character mentioned in which the packing glands of the plug valve may be repacked when the fitting is under pressure.

A further object of this invention is to provide an orifice meter fitting of the character mentioned embodying a controlled by-pass between the upper and lower housing chambers whereby the plug valve may be placed under balanced pressures so that it may be easily turned or operated.

The various objects and features of our invention will be fully understood from the following detailed description of typical preferred forms and applications of our invention, throughout which description reference is made to the accompanying drawings, in which:

The orifice meter fitting provided by this invention includes, generally, a body or housing 10 adapted to be interposed in a pipe line and having a chamber C removed from the flow of fluid, an orifice plate carrier 11, means 12 for retaining the orifice plate P in the carrier 11, means 13 for operating or shifting the carrier 11 between a position where the plate P extends across the fluid passage of the housing 10 and a position at the exterior of the housing where the plate may be replaced and a valve 14 for sealing off between the fluid passage of the housing 10 and the chamber C.

Figures 1, 2, 3:
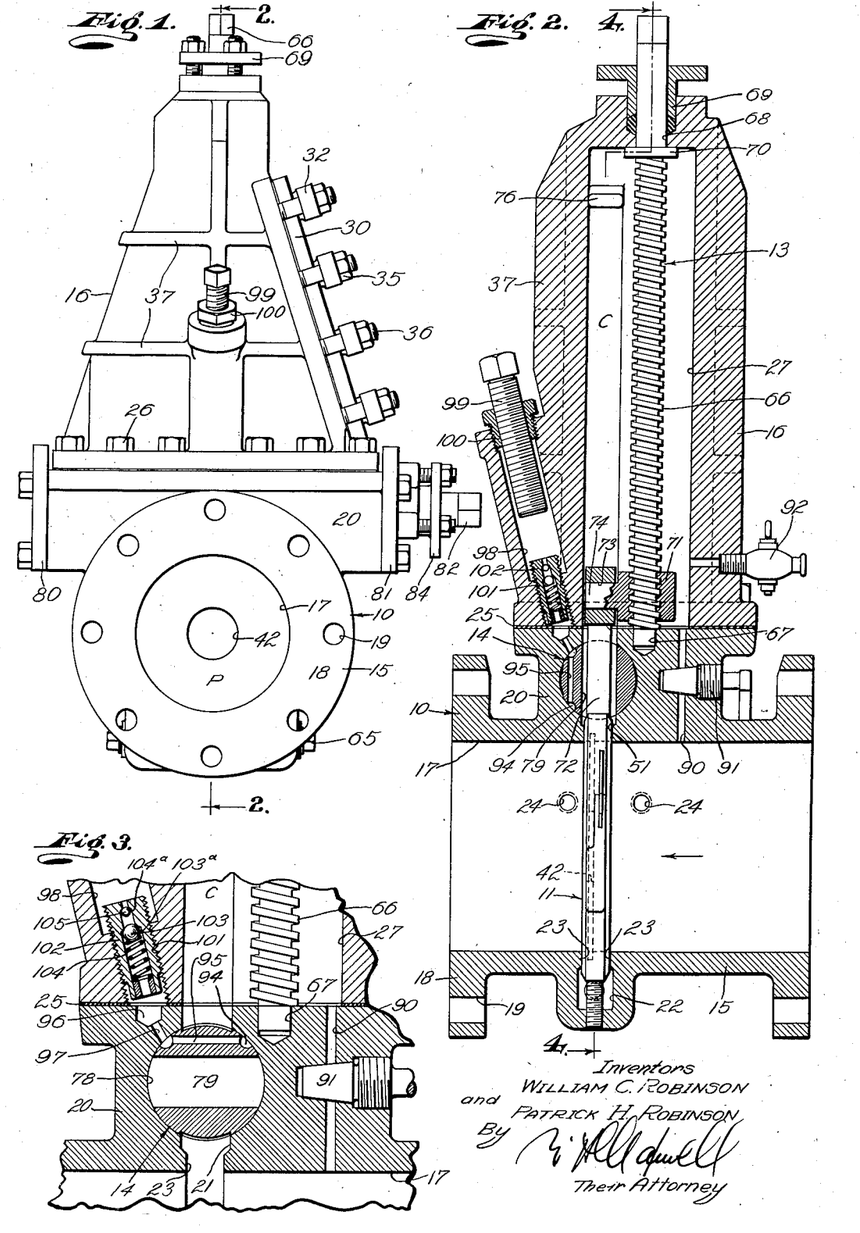
Fig. 1 is an end elevation of the orifice meter fitting provided by this invention.
Fig. 2 is an enlarged vertical detailed sectional view taken substantially as indicated by line 2—2 on Fig. 1 illustrating the orifice plate carrier in its lower position.
Fig. 3 is an enlarged fragmentary vertical detailed sectional view of a portion of the fitting illustrating the plug valve in its closed position.
Figures 4, 5, 6, 7, 8:
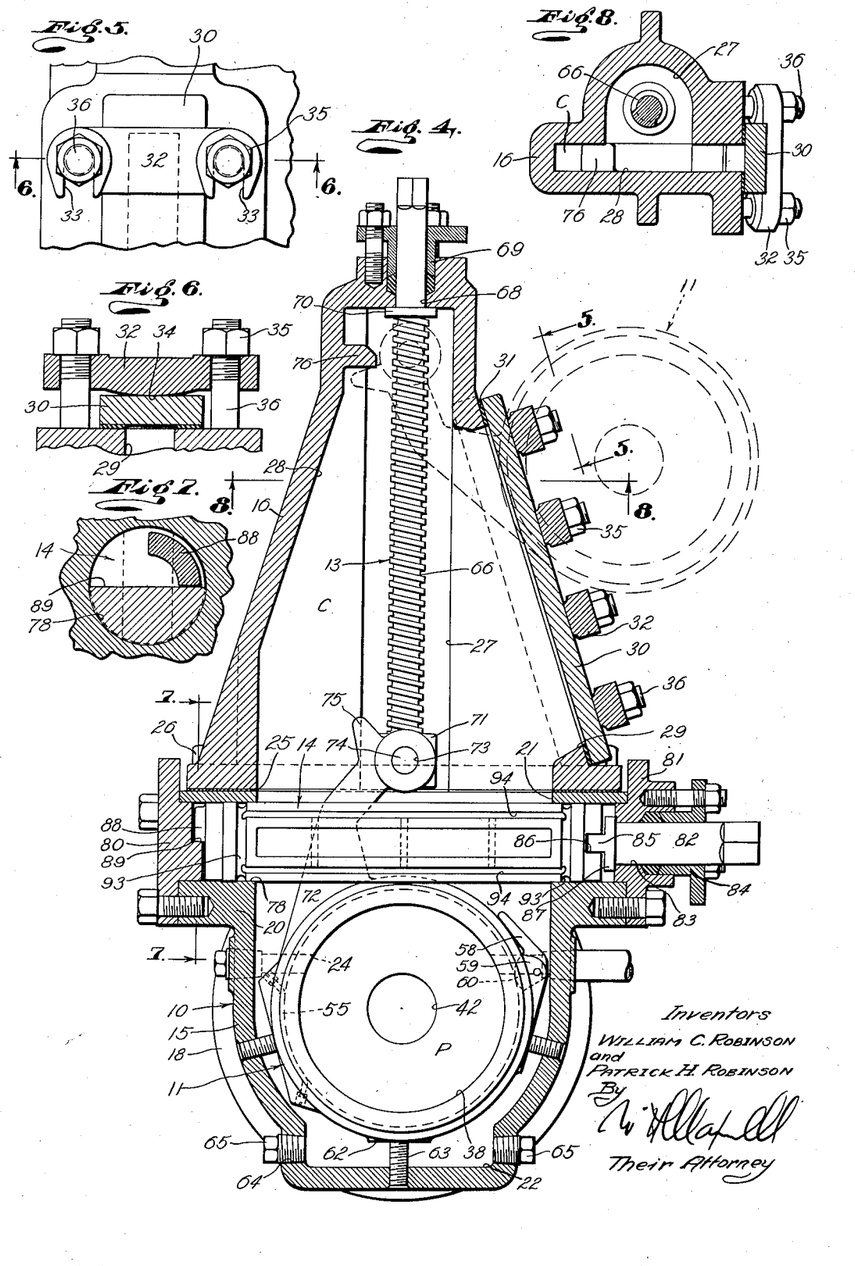
Fig. 4 is a vertical detailed sectional view taken as indicated by line 4—4 on Fig. 2 illustrating the orifice plate carrier, the elevator screw, and the plug valve in elevation and showing in broken lines the up or replacement position of the carrier.
Fig. 5 is an enlarged fragmentary elevation view taken substantially as indicated by line 5—5 on Fig. 4.
Fig. 6 is a transverse detailed sectional view taken substantially as indicated by line 6—6 on Fig. 5.
Fig. 7 is an enlarged fragmentary vertical sectional view taken substantially as indicated by line 7—7 on Fig. 4.
Fig. 8 is a transverse detailed sectional view taken as indicated by line 8—8 on Fig. 4.

The body or housing 10 of the fitting comprises two sections, namely a principal or lower section 15 and a bonnet or upper section 16. The lower section 15 of the housing is tubular having a longitudinal fluid passage 17 while the upper section 16 is hollow having the chamber C. The lower housing section 15 is adapted to be connected in a pipe line so that its passage 17 may conduct the fluid flowing through the line. Suitable means are provided at the opposite ends of the lower section 15 for facilitating its connection in a pipe line. In the particular structure illustrated in the drawings flanges 18 are provided on the opposite ends of the section 15 and are provided with bolt receiving openings 19 whereby the section may be readily connected in a pipe line. The lower housing section 15 is cylindrical in its general configuration and has a flange or block like part 20 on its upper side for carrying the upper section 16 and the valve 14. The part 20 projects upwardly from the section 15 and is elongated transversely of the section to project horizontally therefrom in opposite directions as illustrated in Figs. 1 and 4 of the drawings.

In accordance with the invention a slot 21 extends vertically through the part 20 and intersects or joins the passage 17. The side walls of the slot 21 are parallel and lie in planes at right angles to the longitudinal axis of the fluid passage 17. The lower portion of the slot 21 which joins or intersects the passage 17 forms a circumferentially extending recess or groove 22 in the wall of the passage to receive the plate carrier 11. The upper end of the slot 21 communicates with the lower end of the chamber C. Raised or projecting annular seats 23 are provided on the opposite walls of the groove 22 to surround the passage 17. The seats 23 are machined or finished for engagement by the carrier 11 and the plate retaining means 12. Lateral openings 24 are provided in the wall of the housing section 15 and extend outwardly from the passage 17 to communicate with pipes extending to means for recording and indicating the pressures at the opposite sides of the orifice plate P. In practice a pair of openings 24 may be provided in opposite side wall portions of the housing section 15.

The bonnet section or upper section 16 of the housing rests on the part 20 through a suitable gasket 25. Screws or bolts 26 removably attach the section 16 to the part 20 of the lower section 15. As described above, the lower end of the chamber C is in communication with the slot 21 and the chamber is generally of the same cross sectional configuration as the slot. The opposite side walls of the chamber C are vertical and in alignment with the side walls of the slot 21. The chamber C has a vertically extending enlargement formed by a vertical recess or groove 27 in one of its side walls. The opposite end walls 28 of the chamber C converge upwardly from points spaced above the lower end of the section 16. A slot or elongate opening 29 is provided in one of the walls 28 to admit or pass the carrier 11.

The invention provides a simple closure for the opening 29 that may be very quickly removed and replaced. The closure for the opening 29 is in the form of a simple, rectangular plate 30 adapted to extend over and close the outer end of the opening 29. A suitable gasket 31 may be arranged between the plate 30 and the inclined outer surface of the section 16. A row of spaced studs 36 projects from the section 16 at each side of the opening 29. Lugs or retaining members 32 extend between the horizontally aligned studs 36 and have notches 33 in their lower sides for receiving the studs. The members 32 extend across the plate 30 and have convex or inwardly curved inner surfaces 34 for cooperating with the outer side of the closure or plate. Nuts 35 are threaded on the studs 36 to clamp against the outer sides of the members 32 so that the curved inner surfaces 34 of the members bear inwardly against the closure plate 30 to hold it in position across the opening 29. The nuts 35 may be tightened down to clamp the closure plate 30 against the section 16 to prevent the leakage of fluid under pressure from the opening 29. When it is desired to remove the plate 30 the nuts 35 at one side of the opening 29 may be loosened or threaded outwardly whereupon the members 32 may be individually rocked on their curved surfaces 34 to be easily disengaged from the studs 36. In this manner the retaining members 32 may be removed very quickly to permit the easy removal of the plate 30. The members 32 may be replaced in a similar manner and tightened down by threading in the nuts 35 at only one end of each member. The wall of the upper housing section 16 may follow, generally, the contour of the chamber C and reinforcing ribs 37 may be provided on the exterior of the section.

The carrier 11 is an annular member movable through the slot 21, chamber C and opening 29 by the means 13 and is provided to carry the orifice plate P. When supporting the plate P in its operative position across the passage 17 the carrier 11 is received in the groove 22. The annular carrier 11 has a substantially cylindrical periphery and a cylindrically curved inner surface 38. The diameter of the curved surface 38 is preferably the same as the diameter of the passage 17. In accordance with the invention an annular groove 39 is provided in the interior of the annular carrier 11 to receive the edge portion of the plate P and to carry the means 12. The side wall of the groove 39 is provided with an annular inwardly facing shoulder 40 and a seat or surface 41 for receiving and cooperating with the periphery and a side surface, respectively, of the orifice plate P. The typical orifice plate P illustrated in the drawings is a flat disc having parallel side surfaces and a central orifice or opening 42 for passing the fluid flowing through the pipe lines. The fluid flows through the passage 17 in the direction indicated by the arrows in Figs. 2 and 11 of the drawings and when the plate P is in position across the passage the flow action of the fluid holds the plate against the seat 41 and holds a side of the carrier 11 against one of the seats 23 on the wall of the groove 22. The outer peripheral corners 43 of the annular carrier 11 are preferably bevelled.

The means 12 for removably locking or retaining the plate P in the carrier 11 may include two telescopically related rings 44 and 45 removably assembled in the groove 39 of the carrier 11. The inner ring 44 has an internal diameter equal to the diameter of the fluid passage 17 and is proportioned to rather closely fit between the plate P and a seat 23 when the carrier is in position in the groove 22. The outer ring 45 is shiftable axially or longitudinally on the inner ring 44 and may have sliding engagement with the outer wall of the groove 39. An annular axially facing shoulder 46 on the inner ring 44 faces the inner side of the ring 45 and an outwardly turned or flared lip 47 is provided on the outer end of the ring 44 to limit the longitudinal movement of the ring 45 relative to the ring 44. A diaphragm spring or annular spring 48 bears against the shoulder 46 of the inner ring 44 and has its peripheral edge portion carried in an annular groove 49 in the outer ring 45. The spring urges the rings 44 and 45 apart or away from one another and acts to force the ring 44 against the plate P while urging the ring 45 outwardly to project from the side of the carrier 11 before the carrier is moved into the slot 21. The outer ring 45 has an inclined surface 50 which cooperates with an inclined shoulder 51 on the wall of the slot 21 to force the ring 45 inwardly as the carrier moves downwardly into the groove 22. The pressure exerted by the spring 45 is applied to the plate P to hold it against the seat 41 and is transmitted from the plate to the carrier 11 to hold it against a seat 23 and when the outer ring 45 is forced inwardly this pressure is increased. Thus the spring 48 aids the fluid pressure in holding the plate P against the seat 41 and the carrier 11 against the seat 23. When the carrier 11 is located in its lower position in the groove 22 the outer ring 45 is forced inwardly to the position illustrated in Fig. 11 of the drawings in which position the spring 48 is transversely curved or bent.

The means 12 includes means for removably latching or holding the assembly of rings 44 and 45 in the groove 39 to retain the plate P in the carrier 11 during movement of the carrier through the chamber C and opening 29. An annular channel or groove 52 is provided in the outer wall of the groove 39 and spaced lateral or divergent openings 53 extend outwardly from the groove 52 to the exterior or periphery of the carrier 11. The carrier 11 is thickened or provided with bosses 54 at the outer ends of the openings 53. A wire 55 is threaded through the openings 53 and the groove 52. The wire 55 has a curved portion in the groove 52 and has its opposite end portions in the openings 53.

The wire 55 projects inwardly from the groove 52 to form a projection or stop of substantial length on the wall of the carrier groove 39 which is engageable by a shoulder 56 on the ring 45 to limit the outward movement of the rings 45 and 44 and the plate P. Screws 56ᵃ are threaded into the openings 53 to prevent displacement of the wire 55 and to cause the wire 55 to properly conform to the groove 52.

If desired one or more wires similar to the wire 55 may be provided on the carrier 11 in spaced relation to the wire 55 to hold the assembly of the rings 44 and 45 against displacement from the carrier. In the preferred form of the invention, however, a latch 58 is provided on the peripheral portion of the carrier 11 at a point substantially diametrically opposite the wire 55 to assist in limiting the outward movement of the rings 44 and 45. The latch 58 is pivoted between spaced lugs 59 on the carrier 11 and has a cam part 60 which is adapted to project inwardly into and through the groove 52 to form a stop on the wall of the groove 39 which is engageable by the shoulder 56 to limit the outward movement of the rings 44 and 45. A handle 61 is provided on the latch 58 to facilitate the pivoting of the latch between the position where its cam part 60 is clear of the groove 39 and a position where its cam part projects from the wall of the groove. The handle 61 lies against or in close proximity to the periphery of the carrier 11 when the latch is in its operative position. It is believed that it will be apparent how the wire 55 and the latch 58 are effective in limiting the outward movement of the ring 45 and thus retain the rings 44 and 45 and the plate P in the carrier 11.

Means is provided for locating or centering the carrier 11 in the groove 22 when the carrier is moved to its lower position. Three circumferentially spaced flat surfaces 62 are provided on the periphery of the carrier 11. Stop screws 63 are threaded through openings in the wall of the housing section 15 to project into the groove 22. When the carrier 11 is operated or lowered to its operative position the flat faces 62 are adapted to cooperate with the inner ends of the screws 63 to stop and center the carrier in a position where the opening 42 of the plate P is concentric with the longitudinal axis of the fluid passage 17. Clean out openings or drain openings 64 are provided in the wall of the housing section 15 to communicate with the lower end of the groove 22. The openings 64 are normally closed by plugs 65.

The means 13 for shifting or operating the carrier 11 between the position in the groove 22 where the plate P extends across the passage 17 and a position at the exterior of the housing 10 is a feature of the present invention as it provides for the rapid convenient operation of the carrier to a position at the exterior of the housing where the plate P is conveniently accessible for removal. The carrier operating means 13 includes an elevator screw 66 extending longitudinally or vertically through the groove 27 in the wall of the chamber C. The screw 66 is threaded throughout its major portion and has an unthreaded lower portion rotatable in a socket 67 in the part 20. A cylindrical unthreaded portion of the screw 66 extends through an opening 68 in the upper wall of the housing section 16 to project from the section. A packing gland 69 is provided in the opening 68 to seal about the said portion of the screw 66. The upper end portion of the screw 66 projects from the gland 69 and is polygonal for engagement by a wheel, wrench or other device for turning the screw. A flange 70 is provided on the screw 66 to engage the wall of the chamber C at the lower end of the opening 69 to seal with the wall and to react against the wall to hold the screw against upward movement. The carrier operating means includes a follower or nut 71 threaded on the screw 66. The nut 71 is movable through the groove 27 with suitable clearance when the screw 66 is rotated.

A pivotal connection or lever connection is provided between the nut 71 and the carrier 11. A rigid arm 72 projects upwardly from the periphery of the carrier 11. The arm 72 is spaced at one side of the central vertical axis of the carrier 11 and is sufficiently long to extend upwardly into the chamber C when the carrier 11 is in its lowermost position. The upper end portion of the arm 72 projects inwardly and toward the nut 71 and has a boss provided with a transverse opening 73. A stud or pin 74 projects from the nut 71 and is pivotally received in the opening 73. Thus the carrier 11 is pivotally connected with the nut 71 by the arm 72 and the pin 74. The engagement of the carrier 11 with the side walls of the groove 22, the slot 21 and the chamber C holds the nut 71 against rotation so that rotation of the screw 66 advances or shifts the nut and carrier 11. The carrier 11 being shiftably connected with the nut 71 as just described is free to center itself on the stop screws 63 when moved to its lower position.

The means 13 for operating or shifting the plate carrier 11 includes means for automatically swinging the carrier 11 outwardly through the opening 29 as the carrier moves upwardly through the chamber C to bring the carrier to a position where the plate P is readily accessible for replacement. A projection or lug 75 projects upwardly from the upper portion of the arm 72 and a lug 76 projects inwardly from the wall of the chamber C adjacent the upper end of the chamber. When the nut 71 approaches the upper end of the chamber C the lug 75 cooperates with the lug 76 and as the upward movement of the nut 71 continues the cooperation of the lugs 75 and 76 causes the carrier 11 to swing outwardly through the opening 29. The broken lines in Fig. 4 of the drawings indicates the position to which the carrier 11 is swung by the cooperation of the lugs 75 and 76. When the upward movement of the nut 71 and the carrier 11 stops the carrier 11 is held in the position indicated by the broken lines in Fig. 4, by the cooperation of the lug 75 with the lug 76.

The valve 14 is provided to seal off the chamber C from the fluid passage 17, after the carrier 11 has been brought to a position within the chamber C so that the cover plate 30 may be removed to permit the projection of the carrier 11 without the necessity of interrupting the flow through the pipe line. The valve 14 is a cylindrical plug turnable in a cylindrical opening 78 in the part 20 of the housing section 14. The opening 78 is horizontal and intersects the slot 21 extending horizontally from one end to the other of the slot. The valve 14 has a transverse slot or opening 79 adapted to register with the slot 21 to pass the carrier 11 and receive the arm 72 when the carrier is in its lower position. The opposite ends of the opening 78 are closed by bolted on heads 80 and 81.

Means is provided for turning the valve 14 between the position where it closes the chamber C from the passage 17 and the position where its opening 78 communicates with the slot 21. The means for turning the valve 14 includes a rotatable stem 82 passing through an opening 83 in the cap 81. A packing gland 84 is carried by the cap 81 to seal about the stem 82. The stem 82 projects beyond the packing gland 84 and its projecting portion is polygonal so that it may be readily engaged by a wrench or the like. In accordance with the invention the pressures on the opposite ends of the plug valve 14 resulting from the leakage of fluid under pressure or lubricant under pressure are fully balanced, thus insuring the free turning of the valve. The operative connection between the valve operating stem 82 and the valve 14 is such that the entire end of the valve is exposed to the action of fluid pressure in the end portion of the opening 78. A key or tongue 85 on the inner end of the stem 82 loosely fits a slot 86 in the adjacent end of the valve 14 to form a rotating or driving connection between the stem and the valve. The valve stem 82 has a flange 87 adapted to bear outwardly against the inner side of the cap 81 under the action of the fluid pressure in the opening 78 so that the gland 84 may be repacked when the fitting is under pressure. A lug 88 is provided on the inner end of the valve 14 and is adapted to cooperate with a stop shoulder 89 on the inner side of the cap 80 to stop or limit turning of the valve in the position where its opening 79 is in direct alignment with the slot 21 and the position where it fully closes the slot 21.

A by-pass is provided between the fluid passage 17 and the chamber C whereby the fluid pressures on the valve 14 are balanced to permit the easy operation of the valve. In the particular form of the invention illustrated a by-pass port 90 is provided in the housing section 15 and extends between the fluid passage 17 and the lower end of the chamber C. A valve 91 is provided to control the by-pass port 90. After the carrier 11 has been shifted into the chamber C the valve 91 may be opened to admit fluid under pressure to the chamber C and to maintain the pressure in the chamber equal to the pressure in the passage 17. A drain cock 92 communicates with the chamber C adjacent its lower end to permit the exhaust or discharge of fluid under pressure from the chamber C before removing the cover plate 30.

The present invention provides novel and particularly effective means for lubricating the valve 14 and for providing a lubricant or liquid seal for the valve. A system of lubricant grooves is provided in the valve 14. An annular lubricant groove 93 is provided in each end portion of the valve 14 and two spaced longitudinally extending grooves 94 extend between and connect the annular grooves 93. Longitudinally spaced transverse or tangential ports 95 are provided in the valve 14 to connect the longitudinal grooves 94 at spaced points. An elongate groove or opening 96 of substantial capacity is provided in the upper face of the part 20 to constitute a lubricant distributing opening. Distributing ports 97 are provided in the part 20 to communicate with the opening 96 at longitudinally spaced points and to conduct lubricant to one of the grooves 94 when the valve 14 is in its closed position.

Means is provided for supplying or forcing lubricant under pressure into the opening 96 so that it may pass out through the ports 97 into the grooves 93, 94 and ports 95. The upper housing section 16 has a cylinder opening 98 adapted to contain a supply of grease or other lubricant. A pressure screw 99 is threaded through a bushing 100 in the outer end portion of the opening 98 and is operable to put the lubricant in the opening 98 under high pressure. A port 101 connects the lower end of the cylinder opening 98 with the lubricant distributing opening 96. A check valve is threaded in the part 101. The check valve comprises a tubular body 102, a ball 103 urged outwardly against a seat 103ª in the body by a spring 104, and a second ball 105 adapted to seat outwardly against a seat 104ª on the interior of the valve body by the action of the lubricant under pressure. The spring pressed ball 103 is normally operable to maintain the pressure on the lubricant in the opening 96 and the communicating system of ports and grooves while the ball 105 is adapted to maintain the pressure on the lubricant in the event that the ball 103 is held unseated by dirt or solid matter. The screw 99 may be threaded inwardly from time to time to deliver lubricant under pressure to the opening 96 so that it passes through the spaced ports 97 to the groove 94 and the grooves 93. The lubricant under pressure in the grooves 93 and 94 lubricates the valve 14 and assists the valve in sealing off the chamber C from the fluid passage 17. The lubricant also operates to protect the seating surfaces of the valve 14 and the opening 78 against the action of the fluid. In this regard it is to be noted that the seating surfaces of the valve 14 and the seating surfaces of the opening 78 are covered or in cooperation with one another when the valve is in its normal open position illustrated in Figs. 2 and 4 of the drawings, so that the surfaces are not subjected to the action of the fluid being handled by the pipe line.

Figures 9, 10, 11, 13:
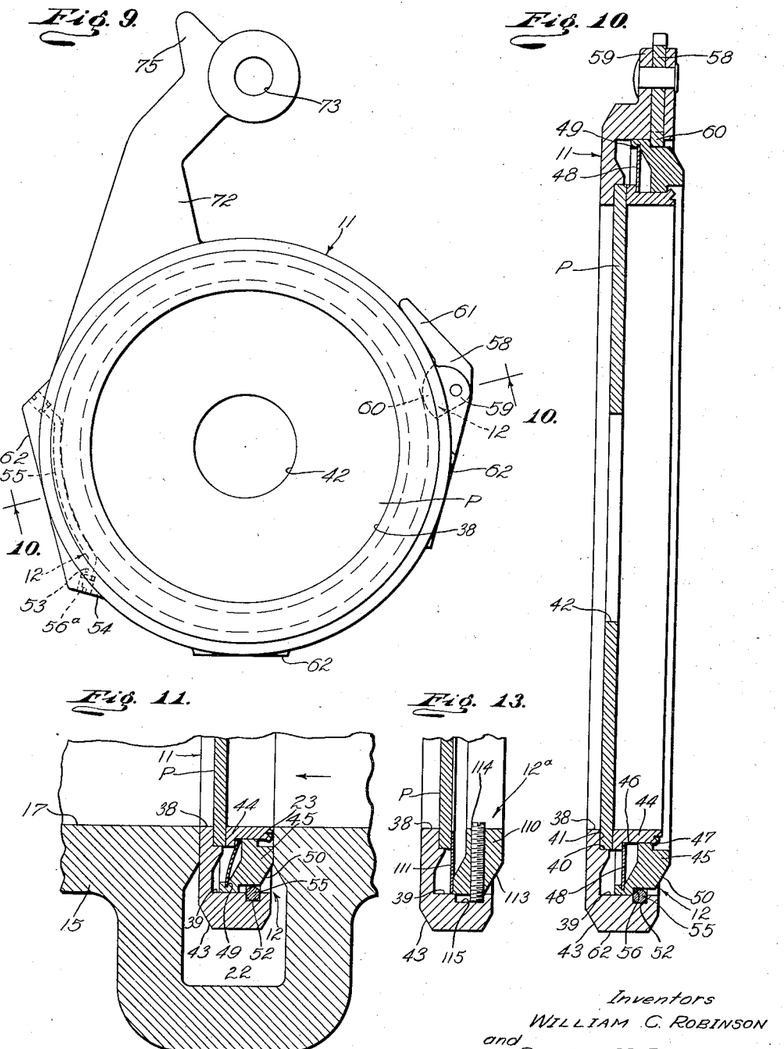
Fig. 9 is an enlarged side elevation of the assembly of the carrier and orifice plate removed from the fitting.
Fig. 10 is an enlarged transverse detailed sectional view taken substantially as indicated by line 10—10 on Fig. 9.
Fig. 11 is an enlarged fragmentary detailed sectional view illustrating the manner in which the plate retaining means provides seals about the plate.
Fig. 13 is a fragmentary detailed sectional view of the carrier and orifice plate illustrating another form of plate retaining means.
Figure 12:
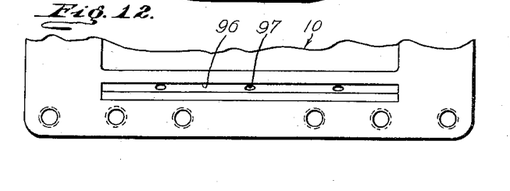
Fig. 12 is a fragmentary plan elevation of the upper face of the lower body section with the bonnet or upper body section removed.

Fig. 13 of the drawings illustrates a modified or alternative form of plate retaining means 12ª. The plate retaining means 12ª includes a single ring 110 adapted to shiftably fit the groove 39 in the carrier 11. A diaphragm or spring 111 similar to the spring 48 is arranged between the orifice plate P and the inner end of the ring 110. The ring 110 is shaped so that it has engagement with the spring 111 adjacent the peripheral portion of the spring. The ring 110 is urged to project from one side of the carrier 11 and its projecting portion has an inclined surface 113. The surface 113 is adapted to cooperate with the inclined shoulder 51 to cause the ring 110 to be forced inwardly against the action of the spring 111. The ring 110 may be held against outward displacement from the groove 39 at one or more points by a wire or wires similar to the wire 55. A screw 114 is adapted to be threaded inwardly through a radial opening in the ring 110 to have its outer end project into a groove 115 in the wall of the groove 39. The screw 114 is adapted to be threaded outwardly after the ring 110 has been arranged in position and is adapted to cooperate with the groove 115 to prevent outward displacement of the ring 110 from the carrier 11. The screw 114 has limited movement in the groove 115 and thus allows limited axial movement of the ring 110. The spring 111 held under pressure between the ring 110 and the plate P serves to hold the plate P in tight engagement with the carrier seat 41.

In the normal operation or use of the orifice meter fitting illustrated in Figs. 1 to 12, inclusive, of the drawings the parts are in the positions illustrated in Figs. 1, 2, 4 to 8 and 11 of the drawings. The orifice plate P extending across the fluid passage 17 produces a differential in pressure at its opposite sides whereby the flow through the pipe line may be metered. The fluid under pressure flowing in the direction indicated by the arrow in Figs. 2 and 11 of the drawings acts on the plate P to maintain it in tight engagement with the carrier seat 41 and holds the carrier 11 against the seat 23 on the downstream side of the carrier. The spring 48 also maintains a pressure on the plate P to hold it against the seat 41. It is to be noted that the inner ring 44 fully closes the space between the plate P and the body seat 23 most remote from the plate and that the carrier seals with the other body seat 23 so that there are no spaces or crevices to accumulate solid matter. The spring 48 acting against the ring 45 urges the ring 45 against one seat 23 and urges the carrier 11 against the other seat 23. The fluid flowing against the plate P also operates to force the carrier 11 against the seat 23. Thus the plate P and the carrier 11 with its ring 45 are maintained in proper sealing engagement with the seats 23. The valve 14 is normally in its open position so that the arm 72 may pass through its opening 79. When in this position the surfaces of the valve and the sealing surfaces of the opening 78 are protected against the action of the fluid.

When it becomes desirable or necessary to replace the orifice plate P the projecting upper end of the screw 66 is engaged for the purpose of turning the screw. Rotation of the screw in the proper direction moves the nut 71 upwardly so that the carrier 11 is moved upwardly into the chamber C. When the carrier 11 has been moved into the chamber C the valve 14 is closed by means of the stem 82 to seal the chamber C from the fluid passage 17. Following the closing of the valve 14 the drain cock 92 may be opened to relieve the pressure in the chamber C. The cover plate 30 may then be removed by loosening a nut 35 at one end of each member 32 and rocking the members to free them from the studs 36. When the plate 30 has been removed the screw 66 is again rotated to move the nut 71 upwardly and bring the lug 75 against the lug 76. Continued upward movement of the nut 71 results in outward swinging of the carrier 11 through the opening 29 finally bringing the carrier 11 to a position such as indicated in broken lines in Fig. 4. With the carrier 11 in this position the orifice plate P may be readily removed from the carrier for replacement.

In the plate retaining means illustrated in Figs. 2, 4, 9, 10 and 11 the latch 58 is pivoted to move its cam part 60 to a retracted position whereupon the assembly of the rings 44 and 45 may be removed from the groove 69 to permit the removal of the plate P from the carrier. The new or replacement plate may be readily inserted in the carrier and latched in position by means of the ring assembly and the latch 58. In replacing the assembly of the rings they are arranged so that the outer ring 45 is within the projecting wire 55 so that the spring and the latch 58 are effective in retaining the assembly in the carrier. It is to be noted that as the carrier 11 is projected laterally through the side opening 98 in the housing its plate P is conveniently accessible for replacement. Further, the carrier in being shifted laterally from the housing does not require excessive head room for the removal and replacing of the plate.

When the new plate has been provided in the carrier 11 the screw 66 may be rotated to move the nut 71 downwardly so that the weight of the carrier and its associated parts causes the carrier to pivot inwardly into the chamber C. The cover plate 30 is then replaced and set in position by the members 32. Following the closing of the opening 29 by the plate 30 the valve 14 is turned to its open position to admit the carrier 11. If desired or found necessary the by-pass valve 91 may be opened prior to opening of the valve 14 so that the pressures on the valve 14 are equalized to permit the easy turning of the valve. With the valve 14 in its open position the screw 66 is turned to move the nut 71 and the carrier 11 downwardly. Upon the carrier approaching its lower position its flat surfaces 62 contact the centering screws 63. As the carrier 11 is pivotally connected with the nut 71 it is free to center itself on the screws 63. During the passage of the carrier 11 through the slot 21 the inclined surface 50 of the ring 45 cooperates with the shoulder 51 to cause the ring 45 to be moved inwardly. The spring 43 acting between the rings 44 and 45 causes the ring 45 to seal and bear against one seat 23 and causes the carrier 11 to seal and bear against the other seat 23. Thus when the carrier 11 reaches its operative position the groove 22 is fully closed and sealed off from the fluid passage 17 and the plate P is tightly and properly held in place across the passage 17. The valve 14 may be lubricated by threading the screw 99 inwardly to displace lubricant from the opening 98 into the opening 96 and the system of lubricant ports and grooves. The packing gland 84 of the valve 14 may be repacked when the fitting is under pressure as the flange 87 maintains a seal about the stem 82. In a similar manner the flange 70 may seal against the wall of the chamber C about the inner end of the opening 68 so that the packing gland 69 may be repacked.

Having described only typical preferred forms and applications of our invention, we do not wish to be limited or restricted to the specific details herein set forth, but wish to reserve to ourselves any variations or modifications that may appear to those skilled in the art or fall within the scope of the following claims.

Having described our invention, we claim:

1. An orifice meter fitting including a body having a fluid passage, a chamber communicating with the passage and having a lateral opening in the chamber wall communicating with the interior of the chamber, an orifice plate carrier, and means for shifting the carrier through the chamber between a position across the fluid passage and a position where it projects through the lateral opening.

2. An orifice meter fitting including a body having a fluid passage, a chamber communicating with the passage and having an opening in its wall communicating with the interior of the chamber, an orifice plate, a carrier for the plate, and screw means for shifting the carrier through the chamber and opening between a position where it supports the plate across the passage and a position at the exterior of the fitting and outside of said chamber.

3. An orifice meter fitting including a housing having a fluid passage and a chamber joining the fluid passage, an orifice plate, a carrier for the plate, and means for shifting the carrier through the chamber between a position where it supports the plate across the passage and a position at the exterior of the housing, said means including an elevator screw, a nut on the screw movable upon rotation of the screw, and a pivotal connection between the carrier and nut.

4. An orifice meter fitting including a housing having a fluid passage and a substantially lateral external opening, an orifice plate, a carrier for the plate, and means for moving the carrier through the housing and said opening between a position where it supports the plate across the passage and a position where it supports the plate at the exterior of the housing, the said means and opening being related so that the carrier moves in a common plane from across the passage to the exterior of the housing.

5. An orifice meter fitting including a housing having a fluid passage and an external opening, an orifice plate, a carrier for the plate, and means for moving the carrier through the housing and said opening between a position where it supports the plate across the passage and a position where it supports the plate for removal at the exterior of the housing, said means including a rotatable elevator screw, a nut on the screw translated by rotation thereof, a pivotal connection between the nut and carrier, a part stationary relative to the housing, and a part on the carrier adapted to cooperate with the stationary part to cause the carrier to swing through the opening as the nut is translated.

6. An orifice meter fitting including a housing having a fluid passage and an external opening, an orifice plate, a carrier for the plate, and means for moving the carrier through the housing and said opening between a position where it supports the plate across the passage and a position where it supports the plate for removal at the exterior of the housing, said means including a rotatable elevator screw, a nut on the screw translated by rotation thereof, an arm on the carrier, a pivotal connection between the arm and nut, a stationary part in the housing, and a part on the arm adapted to cooperate with the stationary part to swing the carrier through the opening as the nut is translated.

7. An orifice meter fitting including a housing having a fluid passage, a chamber joining the passage, the housing having an opening communicating with the chamber, an orifice plate, a carrier for the plate, means for moving the carrier between a position where it supports the plate across the passage and a position at the outside of the opening, said means including a screw in the chamber, a nut on the screw translated upon rotation of the screw, a pivotal connection between the nut and carrier whereby the carrier is translated with the screw, and parts on the carrier and housing adapted to cooperate to swing the carrier through the opening as it moves through the chamber, and means for sealing off the chamber from the passage.

8. An orifice meter fitting including a housing having a fluid passage, a chamber joining the passage, the housing having an opening communicating with the chamber, an orifice plate, a carrier for the plate, means for moving the carrier between a position where it supports the plate across the passage and a position at the outside of the opening, said means including a screw in the chamber, a nut on the screw translated upon rotation of the screw, a pivotal connection between the nut and carrier whereby the carrier is translated with the screw, and parts on the carrier and housing adapted to cooperate to swing the carrier through the opening as it moves through the chamber, a removable closure normally closing the opening, and means for sealing off the chamber from the passage when the closure is to be removed to permit passage of the carrier through the opening.

9. In an orifice meter fitting, a housing having a fluid passage and a chamber joining the passage, an orifice plate carrier adapted to be positioned in the chamber to support an orifice plate across the passage, stop projections in the housing adapted to locate the carrier at the passage, a movable member for shifting the carrier, and a pivotal connection between the member and carrier whereby the carrier may orient itself on the projections when moved to the position where it supports the plate across the passage.

10. In an orifice meter fitting, a housing having a fluid passage, a chamber, an opening connecting the passage and chamber, and an opening extending transversely of and intersecting the first named opening, a plug valve in the second named opening having a slot and turnable between a position where its slot registers with the first named opening to receive an orifice plate carrier and a position where it closes the first named opening, there being a system of lubricant grooves in the plug valve, and means for supplying lubricant to the system of grooves including walls of the housing forming a cylinder opening, a lubricant distribution chamber and spaced ports for conducting lubricant from the distribution chamber to the system of the grooves in the valve, and a plunger operable in the cylinder opening.

11. In an orifice meter fitting, a housing having a fluid passage, a chamber, an opening connecting the passage and chamber, and an opening extending transversely of and intersecting the first named opening, a plug valve in the second named opening having a slot and turnable between a position where its slot registers with the first named opening to receive an orifice plate carrier and a position where it closes the first named opening, there being a system of lubricant grooves in the plug valve, and means for supplying lubricant to the system of grooves including walls of the housing forming a cylinder opening, a lubricant distribution chamber and ports for conducting lubricant from the cylinder opening to spaced parts of the system of grooves, and a threaded plunger for forcing lubricant from the cylinder opening to the system of grooves.

12. An orifice meter fitting including a body having a fluid passage, a chamber intersecting the passage, and an opening in its wall communicating with the chamber, an orifice plate carrier movable through the chamber and adapted to be moved through the opening, and means normally closing the opening comprising a removable closure for the opening, a stud at each side of the opening, nuts on the studs, and a member having notches receiving the studs and a convex inner side adapted to engage the closure when the nuts are tightened down, the member being removable by loosening one nut and rocking the member on its convex surface to free it from the other nut.

13. In an orifice meter fitting, a shiftable carrier having an opening, an axially facing shoulder in the opening, a removable orifice plate arranged in the opening to bear against said shoulder, an axially shiftable member in the opening, and spring means acting between the plate and member to urge the plate against the shoulder and urge the member outwardly against an adjacent part of the fitting.

14. In an orifice meter fitting, a shiftable carrier having an opening, an axially facing shoulder in the opening, a removable orifice plate arranged in the opening to bear against said shoulder, an axially shiftable member in the opening, and an annular spring in the opening urging the plate against the shoulder and urging the memberber in the other direction to project from the carrier for cooperation with an adjacent part of the fitting.

15. In an orifice meter fitting, a shiftable carrier having an opening, an axially facing shoulder in the opening, a removable orifice plate arranged in the opening to bear against said shoulder, an axially shiftable member in the opening, spring means urging the plate against the shoulder and urging the member in the other direction to project from the carrier to engage the fitting, and retractable means on the carrier limiting the outward movement of the member.

16. In an orifice meter fitting, a shiftable carrier having an opening, an axially facing shoulder in the opening, a removable orifice plate arranged in the opening to bear against said shoulder, two telescopically related rings in the carrier related for relative axial movement, one ring being adapted to bear against the plate, the other ring being adapted to project from the carrier, and spring means urging the first named ring against the plate to hold the plate in contact with the shoulder and urging the said other ring to project from the carrier to cooperate with a part of the fitting.

17. An orifice meter fitting comprising a body having a fluid passage and a groove in the wall of the fluid passage, a carrier movable into the groove and having an opening to register with the fluid passage, an axially facing shoulder in the opening, a removable orifice plate in the opening adapted to seal against the shoulder, an axially shiftable member in the said opening of the carrier, spring means urging the plate against the shoulder and urging the member to project from the carrier, and a surface on the member adapted to engage the body as the carrier is moved into the groove to move the member inwardly so that it is adapted to seal with a wall of the groove under the pressure of the spring means, the spring means reacting against the member causing the carrier to seal against the opposite wall of the groove.

18. In a device of the character described, a shiftable carrier having an opening, an axially facing shoulder in the opening, a removable orifice plate in the opening adapted to seal against said shoulder, an axially shiftable member in the opening, spring means acting between the plate and member to urge the plate against the shoulder and to urge the member outwardly, and a releasable latch on the carrier limiting the outward movement of the member.

19. In a device of the character described, a shiftable carrier having an opening, an axially facing shoulder in the opening, a removable orifice plate in the opening adapted to seal against said shoulder, an axially shiftable member in the opening, spring means acting between the plate and member to urge the plate against the shoulder and to urge the member outwardly, and a pivoted latch on the carrier limiting the outward movement of the member.

20. In a device of the character described, a shiftable carrier having an opening, an axially facing shoulder in the opening, a removable orifice plate in the opening adapted to seal against said shoulder, an axially shiftable member in the opening, spring means acting between the plate and member to urge the plate against the shoulder and to urge the member outwardly, a shiftable latch on the carrier, and a cam part on the latch projecting into the opening to limit outward movement of the member and retractable from the opening by shifting of the latch.

21. In an orifice meter fitting, a body having a fluid passage, a chamber joining the passage and an opening in its exterior communicating with the chamber, a shiftable carrier, a threaded stem, a nut on the stem moved by rotation thereof, a pivotal connection between the nut and carrier whereby the carrier is shiftable through the chamber from the passage to the opening, and means for swinging the carrier through said opening during such shifting of the carrier.

22. In an orifice meter fitting, a body having a fluid passage, a chamber joining the passage and an opening in its exterior communicating with the chamber, a shiftable carrier, a threaded stem, a nut on the stem moved by rotation thereof, a pivotal connection between the nut and carrier whereby the carrier is shiftable through the chamber from the passage to the opening, and means for swinging the carrier through said opening during such shifting of the carrier, said means including a part on the carrier, and a part on the body engageable by the part on the carrier.

23. In a device of the character described, a shiftable carrier having an opening, an axially facing shoulder in the opening, a removable orifice plate in the opening adapted to seal against said shoulder, an axially shiftable ring in the opening adapted to seal against the plate, a second shiftable ring in the opening adapted to seal outwardly against an enclosing housing, a spring urging the rings in opposite directions, and means for limiting the outward movement of the said second ring.

24. An orifice meter fitting including, a housing having a fluid passage, a chamber communicating with the passage and having an opening, an orifice plate carrier, an orifice plate, means mounting the plate in the carrier so that the plate is tight in the carrier when the carrier is positioned across the fluid passage, and means for shifting the carrier through the chamber between a position where it projects through the opening to the exterior of the fitting.

25. An orifice meter fitting including, a housing having a fluid passage, a chamber communicating with the passage and having an opening, a removable closure for the opening, means for sealing off the chamber from the passage, an orifice plate carrier, an orifice plate, means mounting the plate in the carrier so that the plate is tight in the carrier when the carrier is positioned across the fluid passage, and means for shifting the carrier through the chamber between a position where it projects through the opening to the exterior of the fitting.

26. An orifice meter fitting including a body having a fluid passage, a chamber communicating with the passage and having an outlet opening, an orifice plate, a carrier for the plate, and means permanently carried by the body for shifting the carrier through the chamber from a position across the fluid passage to a position where it projects through the opening so the plate is outside of the body, the carrier being normally permanently secured to the said means.

PATRICK H. ROBINSON.
WILLIAM C. ROBINSON.